Figure 1:
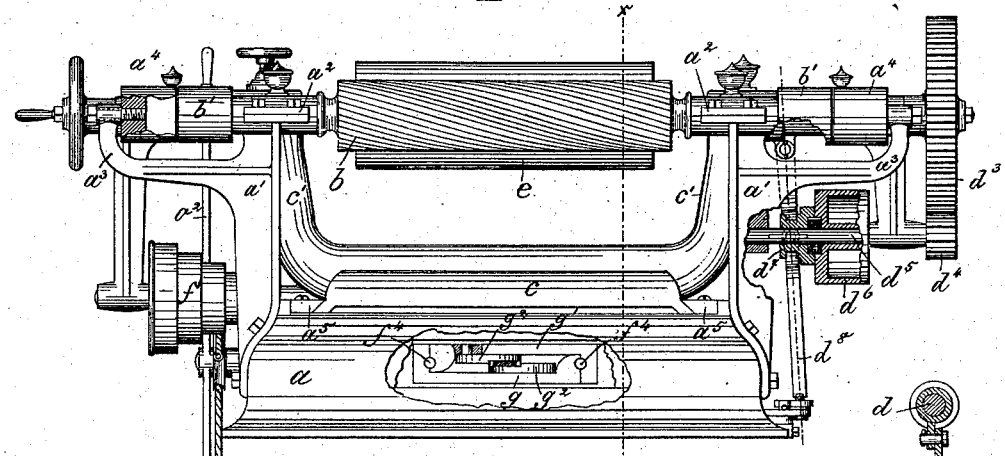

(No Model.) 3 Sheets—Sheet 1.

G. F. EVANS.
MACHINE FOR REDUCING WOOD TO PULP AND FIBER.

No. 293,235. Patented Feb. 12, 1884.

Witnesses.
Arthur Zipperlen.
George L. Reed.

Inventor.
G. Frank Evans.
by Crosby & Gregory
Attys.

(No Model.) 3 Sheets—Sheet 2.
G. F. EVANS.
MACHINE FOR REDUCING WOOD TO PULP AND FIBER.
No. 293,235. Patented Feb. 12, 1884.
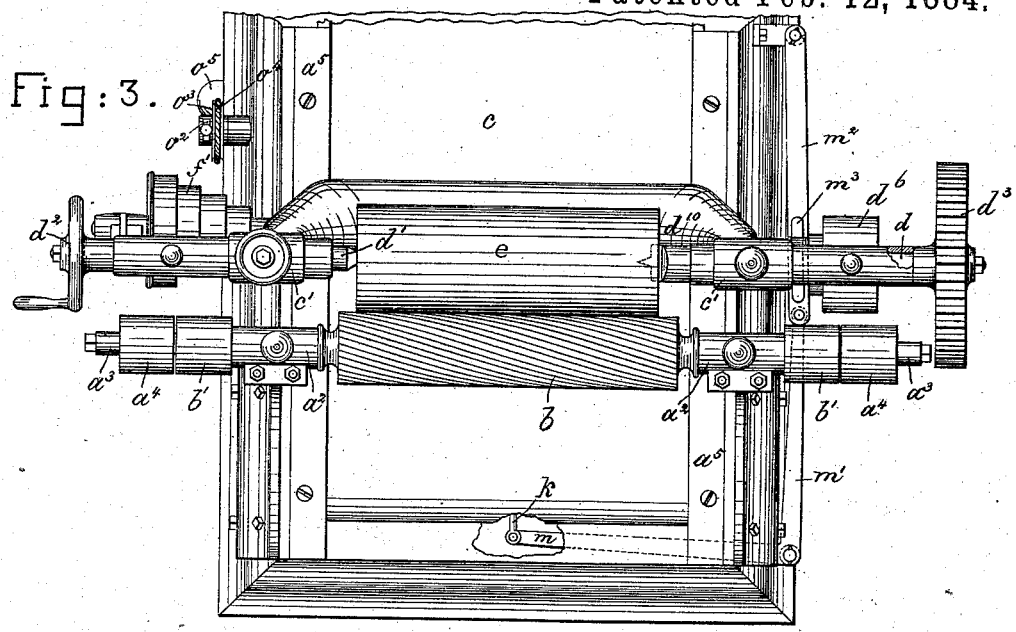
Fig: 3.
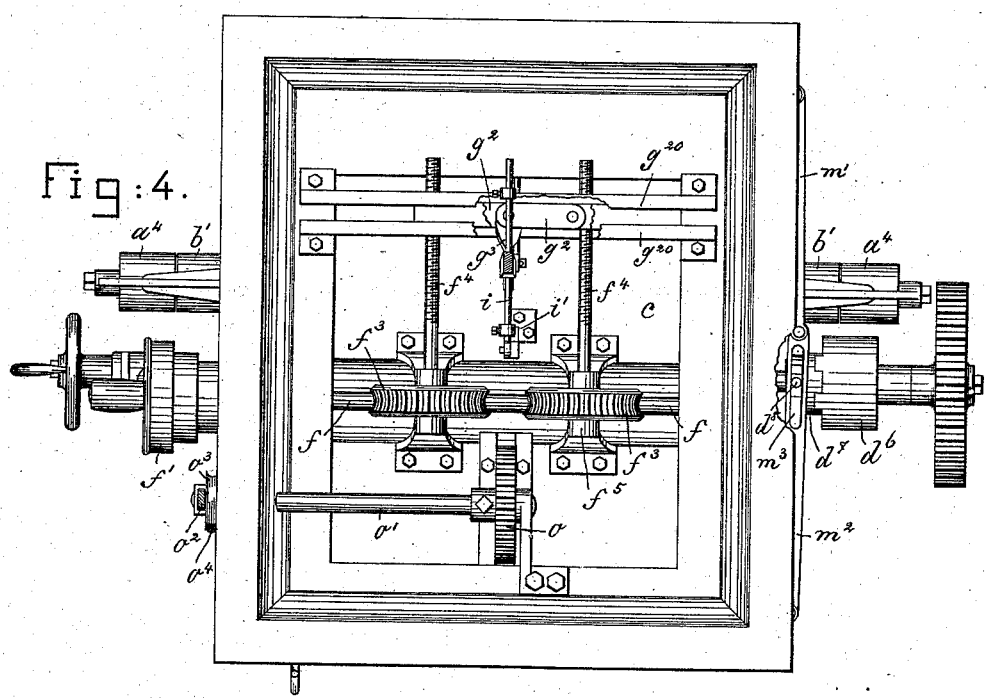
Fig: 4.
Witnesses. Inventor.

(No Model.)  3 Sheets—Sheet 3.

G. F. EVANS.
MACHINE FOR REDUCING WOOD TO PULP AND FIBER.

No. 293,235.  Patented Feb. 12, 1884.

Witnesses.
Arthur Tipperton.
John F. C. Prinkert.

Inventor.
G. Frank Evans
by Crosby Gregory attys.

UNITED STATES PATENT OFFICE.

G. FRANK EVANS, OF MECHANIC FALLS, ASSIGNOR TO THE EVANS FIBER MANUFACTURING COMPANY, OF SACO, MAINE.

MACHINE FOR REDUCING WOOD TO PULP AND FIBER.

SPECIFICATION forming part of Letters Patent No. 293,235, dated February 12, 1884.

Application filed November 19, 1883. (No model.)

*To all whom it may concern:*

Be it known that I, G. FRANK EVANS, of Mechanic Falls, county of Androscoggin, State of Maine, have invented an Improvement in Machines for Reducing Wood to Pulp and Fiber, of which the following description, in connection with the accompanying drawings, is a specification, like letters on the drawings representing like parts.

My invention, relating to a machine for reducing wood for the manufacture of pulp and fiber, is an improvement on machines of the class shown in Letters Patent No. 236,794, granted to me January 18, 1881, to which reference may be had. The machine described in the said patent consisted, essentially, of a rotating cutting-cylinder having formed upon it spiral cutting-edges, the said cutting-cylinder being rotated and acting upon the periphery of a moving piece of wood, preferably a rotating cylindrical block, from which the said edges removed small, narrow shavings of substantially the length of the block, each separate shaving being cut from a different part of the surface of the more slowly-rotating block, instead of being cut continuously from one side of the block, as would be the case if the block being acted upon did not rotate. When a cutter having true spiral cutting-edges operates upon a cylindrical rotating block of wood, each of the said edges will remove a shaving equal in length to the length of the piece of wood, thus making very long slender fibers, which for many purposes require to be subsequently broken up or reduced by another process for the formation of fibers of a shorter length suitable for the manufacture of fine pulp.

The present invention consists, among other things, in providing the machine with blades having their cutting-edges so shaped, as will be described, whereby the shavings may be produced not only narrow and thin, but also as short as may be desired, and of varying shape, suitable for pulp-material of any desired character; and the invention also consists in various details of construction whereby the machine is rendered to a greater or less extent automatic in action and more convenient in operation, thus effecting a saving in time and consequent reduction in the cost of producing pulp-stock.

Figure 2:
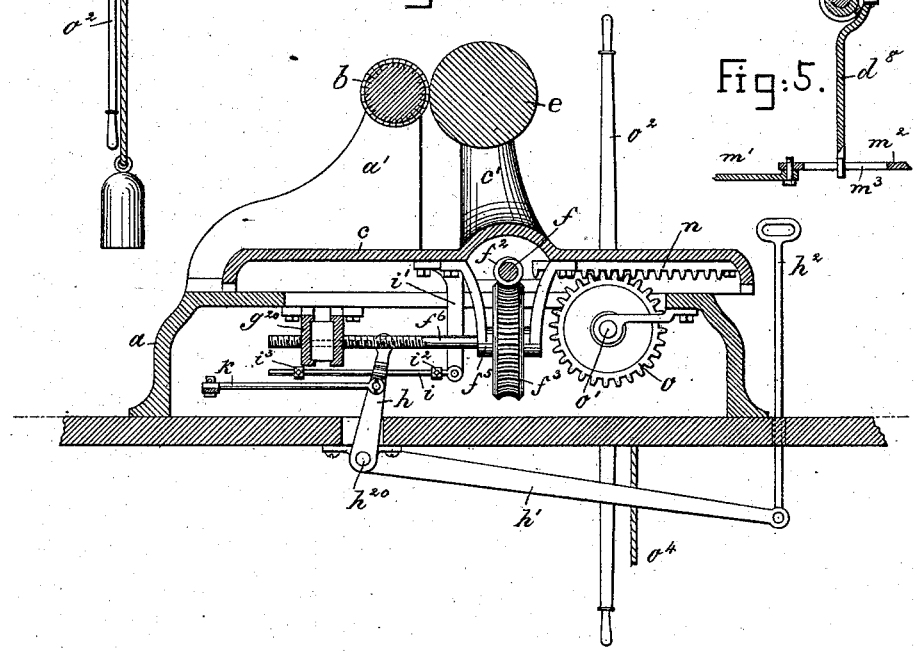
Figure 5:
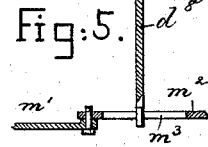
Figure 6:
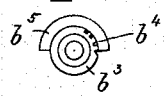

Figure 1 is a front elevation of a machine adapted to reduce wood for the formation of pulp material; Fig. 2, a vertical section thereof on line $x\ x$; Fig. 3, a partial plan view, portions of the base or bed being broken away; Fig. 4, an under side view, showing the feed mechanism; Fig. 5, a detail to be referred to, and Figs. 6 to 13 details of various kinds of cutters employed for producing pulp material of different quality or grades.

The main base $a$ of the machine is provided with uprights $a'$, having bearings $a^2$ for the shaft of the cutter-cylinder $b$, consisting, essentially, of a cylinder provided with spirally-arranged cutter-blades of suitable character to remove from a block of wood thin, narrow, short shavings suitable for use as pulp material, the said cutter-blades being hereinafter more particularly described.

The shaft of the cutter-cylinder $b$ is provided with pulleys $b'$ at either side of the boxes $a^2$, which pulleys receive and are driven by belts from a counter-shaft overhead, the cutter-shaft terminating at the ends of the said pulleys.

The uprights $a'$ are provided with arms $a^3$, having suitable bearing-studs, upon which are mounted the loose pulleys $a^4$, in line with and of the same size of the pulleys $b'$, the said pulleys $a^4$ being adapted to receive upon them the cutter-driving belt, thus enabling the cutting-cylinder to be stopped and removed from the machine without removing its driving-belts from the counter-shaft referred to, thus effecting a considerable saving of time when a cutter is to be removed for the purpose of sharpening its blades, or to be replaced by one that has been sharpened, or one of another character for producing a different kind or grade of shavings.

The base $a$ is provided with guides or ways $a^5$ for a carriage, $c$, provided with uprights $c'$, which are similar in function to the head and tail stocks of a lathe, one holding a revolving spindle, $d$, provided with a suitable chuck, $d^{10}$, to engage one end of the piece, block, or log of the wood $e$, that is to be reduced to shavings, while the other upright is provided with a center, $d'$, operated by a hand-wheel, $d^2$, the said center engaging and forming the center support for the other end of the said block $e$.

The head-stock spindle $d$, carrying the chuck $d^{10}$, is provided with a gear, $d^3$, meshing with a pinion, $d^4$, fixed upon a shaft, $d^5$, having a loose pulley, $d^6$, driven by a suitable belt and provided with clutch projections, (see Fig. 4,) to be engaged by a clutch-box, $d^7$, splined upon the said shaft and operated by a shipper, $d^8$, (see Figs. 1 and 5,) by which the clutch is engaged or disengaged, thereby causing the gears $d^3$ $d^4$ and block $e$ to be rotated or to cease moving, for the purpose of enabling the core or central portion of a reduced block to be removed and another block substituted. The block $e$ is rotated at a slower rate of speed than the cutting-cylinder $b$, to thus present different portions of the surface of the said block. As the block of wood is gradually reduced in diameter by the cutters, the block has to be fed toward the cutting-cylinder, which is accomplished by mechanism now to be described.

The carriage $c$ at the under side has suitable bearings to receive a shaft, $f$, (see Figs. 2 and 4,) provided with a cone-pulley, $f'$, and with two worms, $f^2$ $f^2$. The cone-pulley receives upon it a driving-belt, (not shown,) which, according to its position on the cone-pulley, varies the speed of the shaft $f$. The worms $f^2$ $f^2$ engage worm-gears $f^3$ $f^3$, fixed upon and rotating the threaded shafts $f^4$ $f^4$, which engage threaded recesses of slide-bars $g$ $g'$, adapted to be moved transversely, with relation to the carriage, in guide-ways $g^2$ at the under side of the base $a$ of the machine, the said slide-bars constituting separable nuts, fixed upon shafts $f^4$ $f^4$. Each slide-bar $g$ $g'$ is provided with two threaded recesses or half-nuts—one at each end—for each shaft $f^4$ $f^4$, the said bars being so arranged that by moving them in one direction the half-nuts will simultaneously close upon both shafts $f^4$ $f^4$, so that the latter, in their rotation, will be moved longitudinally into the said nuts, thus moving the carriage $c$, to which the shafts $f^4$ $f^4$ are attached, in the direction to feed the block $e$ toward the cutting-cylinder $b$; but by moving the slide-bars $g$ $g'$ in the opposite direction, or the threaded recesses away from one another, the half-nuts will be separated, to disengage the shafts $f^4$, and leave the latter free to slide longitudinally through the nuts, at which time the carriage may be moved backward and forward, as desired, independently of the feeding mechanism.

That the slide-bars $g$ $g'$ may be moved, as described, to engage or disengage the shafts $f^4$, I have provided toggle-levers $g^2$, connected each at one end with a slide-bar, and the center joint of the said toggle-lever is joined by a link, $g^3$, with an arm, $h$, attached to a rock-shaft, $h^{20}$, having another arm, $h'$, provided with a handle, $h^2$, located at a convenient point of the apparatus, so that it can be moved to strengthen the toggle-lever $g^2$ when it is desired to close the nuts on the shaft to effect the movement of the carriage $c$, or to break the joint of the said toggle-lever, and thereby stop the feed of the said carriage. The half-nuts are closed to start the carriage when the handle $h^2$ is depressed, as shown in Fig. 2, and vice versa. The disengaging mechanism, consisting of the said half-nuts, their actuating toggle-lever, and the arm $h$, connected therewith, is operated automatically to stop the feeding movement of the carriage, when the latter has approached sufficiently near to the cutting-cylinder. This stopping of the carriage is effected by a rod, $i$, passed through an opening in the lever $h$, and connected with an arm, $i'$, fixed upon the under side of the carriage $c$, the said rod being provided with an adjustable collar or projection, $i^2$, which, at the proper time in the feeding movement of the carriage, engages the arm $h$, and moves it to thus separate the half-nuts. The rod $i$ may also, if desired, be provided with a second projection, $i^3$, to move the arm $h$ in the opposite direction, and thus close the half-nuts and start the feeding movement of the carriage on its arrival at the end of its backward movement from the cutter-cylinder. When the forward or feeding movement of the carriage ceases, it is unnecessary longer to rotate the block $e$, and when the said feeding movement has ceased it is desirable to stop the rotation of the spindle and chuck $d^{10}$ and permit a new block, $e$, to be inserted or chucked. The rotation of the said spindle is stopped automatically whenever the nuts are separated to stop the feeding movement of the carriage by the following mechanism:

The arm $h$ is connected by a link, $k$, (see Figs. 2 and 3,) with one arm, $m$, of a bent lever, $m$ $m'$, the other arm, $m'$, of which is connected with a lever, $m^2$, slotted, as shown at $m^3$, for a length equal to the maximum travel of the carriage $c$, the said slot receiving the end of the shipper $d^8$, which controls the clutch $d^6$ $d^7$ before described, the said shipper being pivoted upon the arm $c'$ or head-stock portion of the carriage $c$. By this connection the clutch $d^6$ $d^7$ is disengaged, and the gears $d^3$ $d^4$ cease to rotate whenever the automatic feeding mechanism for the carriage is thrown out of operation, as described. In order to retract the carriage after a piece or block of wood has been properly reduced to shavings, so as to enable a new one to be inserted, the said carriage is provided with a rack, $n$, engaged by a gear, $o$, fast upon a shaft, $o'$, having suitable bearings in the base $a$, and provided with a hand-lever, $o^2$, by which it may be rotated to move the carriage backward and forward, as may be desired, the said shaft $o'$ being provided with a pulley, $o^3$, supplied with a cord, $o^4$, having an attached weight, $o^5$, adapted to rotate the said shaft and gear $o$ in the proper direction to automatically withdraw the carriage from the cutting mechanism when the automatic feeding mechanism is disengaged.

It is obvious that the shipper $d^8$ might throw a belt from a fast to a loose pulley, instead of operating a clutch.

The body $b^3$ of the cutting-cylinder $b$ has a series of spiral grooves, $b^4$, (shown in end view, Fig. 6,) into which the cutting-blades $b^5$ are inserted, (only one blade being shown in Fig. 6,) the blades employed being held in place by staking or compressing the metal of the cylinder $b^3$ against the blade along the edge of the said groove. When the edge of the cutter forms one continuous spiral around the cylinder, as in my patent referred to, it will operate to remove narrow shavings of substantially the whole length of the block $e$, the portion of the blade in contact with the block $e$ traveling along from one to the other end thereof. To obviate the reduction of such long shavings by a subsequent operation, and enable me to produce shorter shavings for pulp material, the edges of the block are made otherwise than true and continuous spirals, as heretofore. This may be accomplished in a variety of ways.

Figure 7:
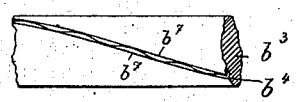
Figure 8:
Figure 9:
Figure 10:
Figure 11:

As shown in Fig. 7, the edge of the cutter may be made to vary somewhat from a true spiral, it having a wave-like form, which may be produced by staking or compressing the metal of the cylinder $b^3$ alternately at opposite sides of the blade, as at $b^7$, thus slightly forcing the edge of the blade first toward one and then toward the other side wall of the groove $b^4$. But one groove and blade is shown in Fig. 7. With a blade or cutting edge of such wave-like curvature the point of maximum curvature toward one side of the said groove $b^4$ will cut most deeply into the periphery of the block $e$, while the part of maximum curvature toward the other side of the said groove will not reach the surface of the said block $e$, so that a series of short shavings will be formed of greatest thickness in their middle and tapering toward their ends, the length of each shaving not exceeding the length of one wave of the blade. The same result may be effected by making the blades $b^5$ of the form shown in Fig. 8, or with its cutting-edge only wave-like in form, as shown in Fig. 9. When it is desired to make the shavings of short length, but of substantially uniform width throughout their length, the front face of the cutting-blades, set in a true spiral, may be grooved, as shown in Figs. 10 and 11; or only its edge may be notched, as shown in Fig. 12, the said grooves or notches breaking up the acting continuity of the cutting-edge and producing thin shavings or flakes of wood of a length equal to the distance between the said grooves or notches.

Figure 12:

The notching shown in Fig. 12 may be accomplished, after setting the blades in the cylinder and sharpening them, by grinding a fine spiral thread about the edges of the cylindrical series of blades.

Figure 13:
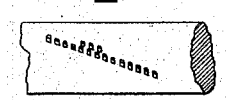

In some cases, where it is desirable to produce very short woody fiber or powder, the cutting portions may be made in narrow separate pieces, as of round or square wire, inserted side by side in the grooves of the cylinder, as shown in Fig. 13. The cutters may be readily removed from the machine while their actuating-belts are supported on pulleys $a^4$, and a cutter of any desired form placed thereon, according to the nature of the product desired or pulp material desired.

I claim—

1. In a machine to reduce wood for the production of fiber, the revolving cutting-cylinder $b$, having pulleys at each end, combined with the two independent loose pulleys to receive the driving-belts, and with supports for the said cylinder and loose pulleys, substantially as and for the purpose described.

2. The carriage $c$, its uprights, the center-point and chuck to hold the block of wood to be reduced, and the base provided with guides to receive the said carriage, combined with the rotating cutting-cylinder, and with means to rotate the said block and move the carriage longitudinally, substantially as described.

3. The carriage, its uprights, and the center-point, chuck, spindle $d$, and gear $d^3$, combined with the pinion $d^4$, shaft $d^5$, and driving-pulley $d^6$, substantially as described.

4. The carriage, its uprights, and the center-point, chuck, spindle $d$, and gear $d^3$, combined with the pinion $d^4$, shaft $d^5$, and loose pulley $d^6$ and clutch, substantially as described.

5. The base $a$, cutting-cylinder, means to rotate it, the separable nuts, and the carriage to support the block of wood, combined with the shaft $f$, its worms, the worm-gears, and the shafts $f^4 f^4$, and with means to rotate the shaft and the said block of wood, substantially as described.

6. The base $a$, the slide-bars $g g'$, the carriage fitted into ways of the base, the threaded shafts $f^4 f^4$, worm-gears $f^3 f^3$, worm-shaft $f$, and means to rotate it, combined with means, substantially as described, to move the slide-bars to close them upon or release them from the said threaded shafts when it is desired to move or stop the said carriage, as set forth.

7. The base $a$, the slide-bars, the toggle-lever, and means to straighten the said toggle-lever or to break its joint, combined with the carriage and its attached threaded shafts, to operate substantially as set forth.

8. In a machine for reducing wood to shavings for the production of pulp, a rotating cutting-cylinder provided with blades shaped substantially as described, to cut from a block short shavings, combined with means, substantially as described, to rotate the block of wood more slowly than the said cutting-cylinder.

9. The carriage, center-point, chuck, and spindle, and means to rotate it, and a block held by the said point and chuck, and the base $a$, combined with a rotating cutting-cylinder provided with blades having their cutting-edges subdivided or shaped to remove short shavings from the periphery of the rotating block, substantially as and for the purpose set forth.

10. The cutting-cylinder and carriage and block supported thereon, and means to rotate the said cutting-cylinder and block, combined with feeding mechanism for moving the said carriage and block toward the cutting-cylinder, and mechanism automatically operated by the carriage, whereby its feeding mechanism is disengaged and the rotation of the block stopped, substantially as described.

11. The cutting-cylinder and carriage and block, and its actuating pulley and clutch, combined with the separable nuts and threaded shafts, and the stopping device, whereby the said nuts are separated and the clutch simultaneously disengaged, substantially as described.

12. The cutting-cylinder and the carriage and block and gears, pulley, and clutch to rotate it, combined with the clutch and shipper and carriage-feeding mechanism, and the arm $h$, connected with the said shipper and with a portion of the carriage-feeding mechanism, and the rod $i$, connected with the carriage and co-operating with the arm $h$, as described, whereby the forward movement of the carriage and rotation of the block are simultaneously stopped, substantially as described.

In testimony whereof I have signed my name to this specification in the presence of two subscribing witnesses.

G. FRANK EVANS.

Witnesses:
G. L. REED,
F. W. DENISON.